United States Patent
Kawasaki et al.

(10) Patent No.: US 11,186,600 B2
(45) Date of Patent: Nov. 30, 2021

(54) BISMUTH COMPOUND, CURABLE COMPOSITION AND CURED PRODUCT

(71) Applicant: TOKUYAMA CORPORATION, Shunan (JP)

(72) Inventors: Takayoshi Kawasaki, Shunan (JP); Junji Momoda, Shunan (JP); Tomohiro Kawamura, Shunan (JP); Mayumi Kishi, Shunan (JP); Michihito Nakatani, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 0 days.

(21) Appl. No.: 16/980,466

(22) PCT Filed: Mar. 14, 2019

(86) PCT No.: PCT/JP2019/010471
§ 371 (c)(1),
(2) Date: Sep. 14, 2020

(87) PCT Pub. No.: WO2019/177084
PCT Pub. Date: Sep. 19, 2019

(65) Prior Publication Data
US 2021/0070790 A1    Mar. 11, 2021

(30) Foreign Application Priority Data

Mar. 16, 2018 (JP) .............................. JP2018-048705

(51) Int. Cl.
*C07F 9/94* (2006.01)
*C08F 212/08* (2006.01)
(Continued)

(52) U.S. Cl.
CPC ................. *C07F 9/94* (2013.01); *C07F 9/09* (2013.01); *C07F 9/92* (2013.01); *C08F 212/08* (2013.01); *C08F 220/06* (2013.01)

(58) Field of Classification Search
CPC ........ C08F 212/08; C08F 220/06; C07F 9/94; C07F 9/092; C07F 9/09
(Continued)

(56) References Cited

U.S. PATENT DOCUMENTS 4,820,748 A * 4/1989 Yamamori ........... C09D 5/1687
523/122
4,835,231 A   5/1989 Yamamori et al.
(Continued)

FOREIGN PATENT DOCUMENTS

JP    55-57200 A    4/1980
JP    63-56510 A    3/1988
(Continued)

OTHER PUBLICATIONS

Li, "Facile synthesis of monodisperse Bi2O3 nanoparticles," Materials Chemistry and Physics, vol. 99, 2006, pp. 174-180.
(Continued)

*Primary Examiner* — William K Cheung
(74) *Attorney, Agent, or Firm* — Birch, Stewart, Kolasch & Birch, LLP

(57) ABSTRACT

A bismuth compound which is little toxic, insoluble in a monomer, usable for optical purpose and used as a substitute for a lead compound, in which a phosphoric acid ester having a (meth)acrylic group(s) is bonded to bismuth, and a method of producing the bismuth compound by reacting bismuth (meth)acrylate or bismuth subsalicylate with a phosphoric acid ester having a (meth)acrylic group(s) and carrying out dehydration.

14 Claims, 1 Drawing Sheet

(51) Int. Cl.
*C08F 220/06* (2006.01)
*C07F 9/92* (2006.01)
*C07F 9/09* (2006.01)

(58) Field of Classification Search
USPC .......................................................... 526/190
See application file for complete search history.

(56) References Cited

U.S. PATENT DOCUMENTS

| | | | |
|---|---|---|---|
| 2010/0087613 A1* | 4/2010 | Takei | C08F 4/40 526/313 |
| 2010/0234498 A1 | 9/2010 | Iwazumi et al. | |
| 2015/0348660 A1 | 12/2015 | Cardon et al. | |

FOREIGN PATENT DOCUMENTS

| | | |
|---|---|---|
| JP | 63-72768 A | 4/1988 |
| JP | 10-512877 A | 12/1998 |
| JP | 2001-83288 A | 3/2001 |
| JP | 2010-235553 A | 10/2010 |
| JP | 2012-87070 A | 5/2012 |
| JP | 2017-516991 A | 6/2017 |
| WO | WO 96/22994 A1 | 8/1996 |
| WO | WO 2007/105355 A1 | 9/2007 |

OTHER PUBLICATIONS

Mallahi et al., "Synthesis and characterization of Bismuth oxide nanoparticles via sol-gel method," American Journal of Engineering Research (AJER), vol. 3, Issue 4, 2014, pp. 162-165.

Miersch et al., "Organic-inorganic hybrdi materials starting from the novel nanoscaled bismuth oxido methacrylate cluser," Chem. Commun., vol. 47, 2011, pp. 6353-6355.

International Preliminary Report on Patentability and Written Opinion of the International Searching Authority (Forms PCT/IB/373, and PCT/ISA/237) for International Application No. PCT/JP2019/010471, dated Sep. 22, 2020, with English translation of the Written Opinion.

International Search Report (Form PCT/ISA/210) for International Application No. PCT/JP2019/010471, dated Jun. 4, 2019, with English translation.

\* cited by examiner

[FIG. 1]
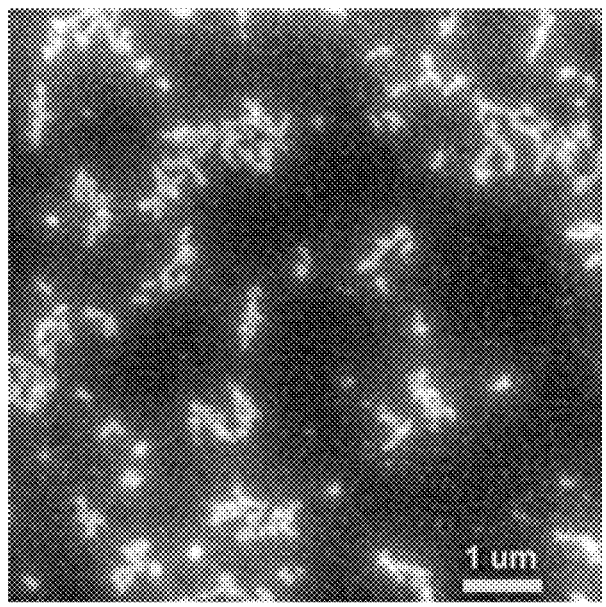
[FIG.2]
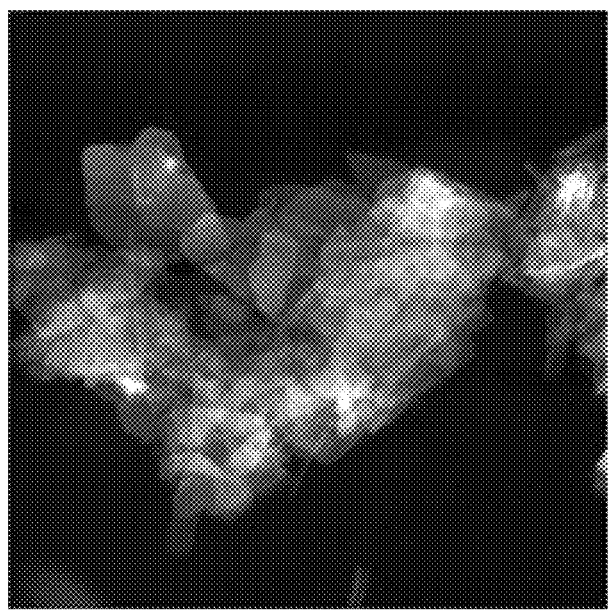

US 11,186,600 B2

BISMUTH COMPOUND, CURABLE COMPOSITION AND CURED PRODUCT

This application is a U.S. National stage application of International Patent Application No. PCT/JP2019/010471, filed on Mar. 14, 2019, which claims priority under 35 U.S.C. § 119(a) to Japanese Patent Application No. 2018-048705, filed in Japan on Mar. 16, 2018. The entire disclosure of Japanese Patent Application No. 2016-169671 is hereby incorporated herein by reference.

TECHNICAL FIELD

The present invention relates to a novel bismuth compound, a novel curable composition comprising the bismuth compound and a novel cured product obtained by curing the curable composition.

BACKGROUND ART

Studies on a material containing bismuth and not a material containing environmentally harmful lead as an X-ray shielding material are now under way. Bismuth is an atom which has high X-ray shielding performance as compared with compounds containing barium, antimony and tin and therefore is suitable as a substitute for lead.

For example, as for a material containing bismuth, there is known a method of directly kneading bismuth or a bismuth compound with a resin material (refer to Patent Document 1). According to this method, bismuth or a bismuth compound can be blended into various materials.

However, there is room for improvement in this method since this method uses direct kneading, thereby making it impossible to disperse bismuth completely unless it is perfectly kneaded.

Meanwhile, there is known a compound obtained by coordinating an organic group with bismuth to make it easy for bismuth to be dispersed in an organic material (refer to Patent Document 2, Non-patent Document 1 and Non-patent Document 2). According to these methods, bismuth becomes compatible with an organic material, whereby bismuth is easily dispersed in the material as compared with a method in which bismuth is directly kneaded with a resin. In a bismuth compound into which an organic group has been introduced by the above method, the organic group is an alkyl group or aryl group (refer to Patent Document 2) or a polyethylene glycol chain (refer to Non-patent Documents 1 and 2).

To obtain a material containing bismuth dispersed in an organic material more easily and efficiently, for example, a method in which a curable composition is obtained by mixing a radically polymerizable monomer with a bismuth compound and polymerized to obtain a cured product is preferably employed.

However, since a compound obtained by coordinating an organic group with bismuth by the above method does not have a polymerizable group which can involve in the polymerization of the radially polymerizable monomer, when the compound is used, the curable composition is not fully polymerized and the cured product may not be obtained.

When bismuth is to be dispersed in a cured product obtained by using the above curable composition comprising a radically polymerizable monomer, it is conceivable to use a compound obtained by coordinating a polymerizable group such as (meth)acrylic acid with bismuth (refer to Non-patent Document 3 and Patent Document 3). It is known that a complex described in Non-patent Document 3 has improved solubility as dimethyl sulfoxide (DMSO) is coordinated in addition to (meth)acrylic acid.

However, there is room for improvement in the compound of Non-patent Document 3 since the compound contains DMSO, thereby making it difficult to highly crosslink (polymerize) the compound. Further, in the polymerization method disclosed by Non-patent Document 3, only copolymerization with methyl methacrylate in dimethyl formamide (DMF) is disclosed. Since polymerization is carried out in a solution, it is difficult to contain bismuth in the obtained cured product in a high concentration.

Meanwhile, in the compound of Patent Document 3, not only (meth)acrylic acid but also salicylic acid are bonded, and it was found from studies conducted by the inventors of the present invention that the compound is unsatisfactory in terms of solubility in another monomer such as a crosslinking agent with the result that it is difficult to contain bismuth in the cured product in a high concentration.

PRIOR ARTS

Patent Documents

Patent Document 1: JP-A 2001-83288
Patent Document 2: JP-A 10-512877
Patent Document 3: JP-A 2017-516991

Non-Patent Documents

Non-patent Document 1: Materials Chemistry and Physics, Vol. 99, 174-180 (2006)
Non-patent Document 2: American Journal of Engineering Research, Vol. 3, 162-165 (2014)
Non-patent Document 3: Chemical Communications, Vol. 47, 6353-6355 (2011)

DISCLOSURE OF THE INVENTION

Problem to be Solved by the Invention

It is therefore an object of the present invention to provide a novel bismuth compound having high solubility in an organic material, especially a radically polymerizable monomer.

It is another object of the present invention to provide a novel bismuth compound which is copolymerizable with the radically polymerizable monomer, can highly disperse a bismuth component in a cured product obtained from a curable composition comprising the radically polymerizable monomer and can reduce the coloration of the cured product.

It is still another object of the present invention to provide a method of producing the above bismuth compound.

Other objects and advantages of the present invention will become apparent from the following description.

Means for Solving the Problem

The inventors of the present invention conducted intensive studies to solve the above problem and found that the above problem can be solved by a bismuth compound in which a phosphoric acid ester having a (meth)acrylic group(s) is bonded to bismuth. The present invention was accomplished based on this finding.

That is, the present invention is (1) a bismuth compound in which a phosphoric acid ester having a (meth)acrylic group(s) is bonded to bismuth.

The present invention can take the following modes.

(2) The bismuth compound in the above paragraph (1), wherein salicylic acid or (meth)acrylic acid is further bonded to the bismuth. That is, it is a bismuth compound in which a phosphoric acid ester having a (meth)acrylic group(s) and salicylic acid or (meth)acrylic acid are bonded to the bismuth.
(3) The bismuth compound in the above paragraph (1) or (2), wherein the phosphoric acid ester having a (meth)acrylic group(s) is at least one selected from dihydrogen 2-((meth)acryloyloxy)ethyl phosphate and hydrogen bis[2-((meth)acryloyloxy)ethyl] phosphate.
(4) A curable composition comprising the bismuth compound of any one of the above paragraphs (1) to (3) and a radically polymerizable monomer different from the bismuth compound.
(5) The curable composition in the above paragraph (4), wherein the radically polymerizable monomer contains a styrene compound.
(6) A cured product of the curable composition of the above paragraph (4) or (5).
(7) A method of producing the bismuth compound of the above paragraph (1) by reacting bismuth (meth)acrylate or bismuth subsalicylate with a phosphoric acid ester having a (meth)acrylic group(s) and carrying out dehydration.
(8) The method in the above paragraph (7), wherein the phosphoric acid ester having a (meth)acrylic acid is used in an amount of 0.3 to 10 moles based on 1 mole of bismuth (meth)acrylate or bismuth subsalicylate to produce the above bismuth compound.
(9) The method in the above paragraph (7) or (8), wherein bismuth (meth)acrylate or bismuth subsalicylate is reacted with the phosphoric acid ester having a (meth)acrylic group(s) in an aliphatic hydrocarbon solvent or aromatic solvent and dehydration is carried out.
(10) The method in any one of the above paragraphs (7) to (9), wherein bismuth (meth)acrylate or bismuth subsalicylate is reacted with the phosphoric acid ester having a (meth)acrylic group(s) under reduced pressure at a temperature of 50 to 100° C. and dehydration is carried out.

Effect of the Invention

The present invention provides a bismuth compound which has high solubility in an organic material, especially a radically polymerizable monomer. Further, the bismuth compound of the present invention is radically polymerizable, and when it is copolymerized with a radically polymerizable monomer different from the bismuth compound, a cured product containing a bismuth component highly dispersed therein can be obtained. In addition, the bismuth compound can suppress the coloration of the cured product.

As a result, by using the bismuth compound of the present invention, a cured product which is safe, has an excellent X-ray shielding effect, is rarely colored and has high transmittance can be produced. Therefore, the obtained cured product can be advantageously used in spectacle lenses for medical use.

BRIEF DESCRIPTION OF THE DRAWINGS

FIG. 1 is a field emission scanning transmission electron micrograph (STEM) of the bismuth component of a bismuth compound produced in Example 1.

FIG. 2 is a field emission scanning transmission electron micrograph (STEM) of the bismuth component of a bismuth compound produced in Example 2.

BEST MODE FOR CARRYING OUT THE INVENTION

The present invention relates to a bismuth compound in which a phosphoric acid ester having a (meth)acrylic group(s) is bonded to bismuth. In the present invention, "(meth)acrylic" refers to methacrylic and/or acrylic. The bismuth compound exhibits an excellent effect since what is bonded to bismuth is a phosphoric acid ester having a (meth)acrylic group(s). In the bismuth compound, a phosphoric acid ester having a (meth)acrylic group(s) is bonded to bismuth. As for the production thereof, a method of obtaining the bismuth compound of the present invention by bonding a phosphoric acid ester having a (meth)acrylic group(s) to bismuth (meth)acrylate or bismuth subsalicylate is preferred.

As the above bismuth (meth)acrylate or bismuth subsalicylate, known compounds may be used.

A description is first given of bismuth (meth)acrylate or bismuth subsalicylate.

<bismuth (meth)acrylate>

In the present invention, the bismuth (meth)acrylate includes a compound in which (meth)acrylic acid is bonded to bismuth.

The bismuth (meth)acrylate may include a compound in which bismuth oxide and (meth)acrylic acid form a composite (to be simply referred to as "compound derived from bismuth oxide (meth)acrylate" hereinafter) besides the compound in which (meth)acrylic acid is bonded to bismuth. Although the structure of the compound forming this composite ("compound derived from bismuth oxide (meth)acrylate") is unknown, it is considered that it is a compound in which a hydroxyl group formed on the surface of bismuth oxide and (meth)acrylic acid are bonded by condensation. Whether the compound derived from bismuth oxide (meth)acrylate is contained or not can be estimated from the production conditions (balance of raw materials) of the compound or the infrared spectroscopy (IR) or elemental analysis of a product.

Although it is extremely difficult to separate this compound derived from bismuth oxide (meth)acrylate from bismuth (meth)acrylate, the effect of the present invention is not greatly impaired by the existence of the compound. Therefore, when the bismuth compound of the present invention is to be obtained, if this compound derived from bismuth oxide (meth)acrylate is contained, there is no problem with the proceeding of a reaction as it is.

The bismuth (meth)acrylate of the present invention is represented by the following formula (1).

[Formula 1]

[formula 1]

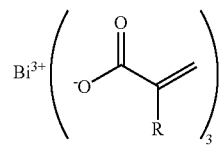

(1)

In the above formula, R is a hydrogen atom or methyl group.

The bismuth (meth)acrylate is a compound in which (meth)acrylic acid is bonded to bismuth ($Bi^{3+}$), and the bismuth component can be confirmed by a field emission scanning transmission electron microscope (STEM). That is, the dispersion state of bismuth in the bismuth (meth)acrylate can be observed through the field emission scanning transmission electron microscope. The observation conditions of the field emission scanning transmission electron microscope are as will be shown in Examples below. When measured under the following conditions, the bismuth component is observed in white.

It is considered in the present invention that the bismuth (meth)acrylate is agglomerated due to its high associating properties or low solubility in a solvent. Therefore, when the bismuth component is observed through STEM, it is observed as an agglomerated particle. In the present invention, the largest diameter (may be simply referred to as "long diameter" hereinafter) of the agglomerated particle is preferably 0.1 to 30 nm, more preferably 0.1 to 20 nm, much more preferably 0.5 to 10 nm. That is, in the present invention, the bismuth (meth)acrylate represented by the above formula (1) preferably has a long diameter (size) of the agglomerated particle observed through STEM of 0.1 to 30 nm. It is considered that, when the long diameter falls within a range of 0.1 to 30 nm, even in a bismuth compound which will be described hereinafter, the agglomerated particle satisfies the same long diameter range and accordingly, solubility and dispersibility in a radically polymerizable monomer become high. A prior art bismuth compound into which an organic group has been introduced becomes an agglomerated particle having a long diameter of more than 30 nm according to studies conducted by the inventors of the present invention.

<bismuth subsalicylate>

In the present invention, the bismuth subsalicylate includes a compound in which salicylic acid is bonded to bismuth. The bismuth component can be confirmed by the same method as the above bismuth (meth)acrylate.

The bismuth subsalicylate of the present invention is represented by the following formula (2).

[formula 2]

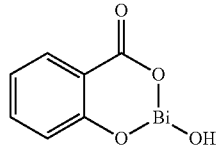

(2)

In the present invention, although the production method of the bismuth (meth)acrylate or bismuth subsalicylate is not particularly limited, they may be produced by known methods. Commercially available bismuth (meth)acrylate or bismuth subsalicylate may be used.

Taking bismuth (meth)acrylate as an example, an example of the method thereof is described below.

<Production Method of bismuth (meth)acrylate>

The bismuth (meth)acrylate is produced by mixing together bismuth nitrate and (meth)acrylic acid in the presence of an acid and neutralizing the resulting mixture with a base. At this point, an excessive amount, for example, 5 to 10 moles of (meth)acrylic acid is used based on 1 mole of bismuth nitrate. A description is subsequently given of each component.

<Acid>

Preferred examples of the acid used to produce the bismuth (meth)acrylate of the present invention include inorganic acids such as hydrochloric acid, sulfuric acid and nitric acid. Out of these, nitric acid is particularly preferably used to reduce impurities.

The acid may be made existent in a reaction system in the form of an aqueous solution. Therefore, in the method of producing bismuth (meth)acrylate, water is preferably contained as a solvent. When the acid is used in the form of an aqueous solution, a commercially available 0.01 to 16 N acid aqueous solution may be used as the acid.

The amount of the acid is preferably 0.1 to 1 mole based on 1 mole of bismuth nitrate (for example, in the case of nitric acid, 0.1 to 1 mole of $HNO_3$).

<Bismuth Nitrate>

As the bismuth nitrate used to produce the bismuth (meth)acrylate, a commercially available product may be used.

<(meth)acrylic Acid>

As the (meth)acrylic acid used to produce the bismuth (meth)acrylate, a commercially available product may be used.

To produce the above bismuth (meth)acrylate in the present invention, the amount of (meth)acrylic acid is preferably 5 to 10 moles based on 1 mole of bismuth nitrate. When (meth)acrylic acid is used in that amount, the above bismuth (meth)acrylate having a long diameter of the bismuth component of 0.1 to 30 nm can be easily produced. Thus, bismuth (meth)acrylate which is rarely colored can be obtained. From the viewpoints of the productivity, coloration, control of the long diameter of the bismuth component, reaction efficiency and post-treatment of the obtained bismuth (meth)acrylate, the amount of (meth)acrylic acid is preferably 3 to 20 moles, more preferably 5 to 10 moles based on 1 mole of bismuth nitrate.

<Base>

In the production of the bismuth (meth)acrylate, the base is used to neutralize the above (meth)acrylic acid as a raw material and the above acid and known bases may be used. Examples of the base include inorganic bases such as alkali hydroxides and organic amines such as amine compounds. Out of these, inorganic bases such as alkali hydroxides are preferably used, and sodium hydroxide is particularly preferably used from the viewpoints of productivity, cost and ease of removal in the post-process.

The base is used to neutralize the acid component excessively existing after bismuth nitrate is reacted with (meth)acrylic acid in the presence of an acid. Therefore, the amount of the base is preferably set to almost the same number of moles as the total number of moles of (meth)acrylic acid which is used excessively (when 3 moles of (meth)acrylic acid is used based on 1 mole of bismuth nitrate) and the above acid. For example, when 0.5 mole of the acid and 5 moles of (meth)acrylic acid are used based on 1 mole of bismuth nitrate, almost 5.5 moles of the base is preferably used.

<Reaction Conditions>

A description is given of production conditions other than the above conditions in the production method of bismuth (meth)acrylate.

In the production method of bismuth (meth)acrylate, an acid, bismuth nitrate and (meth)acrylic acid are mixed together under agitation in a reaction system. To mix together these components under agitation, it is preferred that a solvent should be used to mix together these components therein.

Examples of the solvent include water, methanol, ethanol, acetone and THF. Out of these, water is preferably used.

The solvent is preferably used in an amount that enables all the components to be completely mixed together. When complete mixing and ease of removal are taken into consideration, the amount of the solvent is preferably 3 to 50 ml, more preferably 5 to 20 ml, much more preferably 7.5 to 15 ml based on 1 g of bismuth nitrate.

To introduce all the components into the reaction system, for example, a method in which an acid diluted with the above solvent as required, bismuth nitrate diluted with the above solvent as required and (meth)acrylic acid diluted with the above solvent as required are added together to the inside of a reaction system and mixed together under agitation may be employed. Also, a method in which a solvent is introduced into a reaction system in advance, an acid diluted with the above solvent as required, bismuth nitrate diluted with the above solvent as required and (meth)acrylic acid diluted with the above solvent as required are added together to the inside of the reaction system and mixed together under agitation may be employed. Further, a method in which two components are introduced into a reaction system in advance and the other one component is introduced into the reaction system, or one component is introduced into the reaction system in advance and the other two components are added together or sequentially and mixed with the above component under agitation may be employed. Out of these, the following method is preferably employed to reduce the coloration of the obtained bismuth (meth)acrylate and improve productivity. A mixture of water and bismuth nitrate and nitric acid (nitric acid diluted with water is used if necessary) are first mixed together. A polymerization inhibitor such as dibutyl hydroxy toluene (BHT), hydroquinone or 4-tert-butylpyrocatechol is added to the obtained mixed solution, and (meth)acrylic acid is finally mixed. Although bismuth nitrate may remain solid as a precipitate according to the amount of the solvent in use, when a reaction is carried out with a composition ratio that ensures that all the components are dissolved homogeneously at a temperature of 60° C., the reaction proceeds smoothly advantageously.

The temperature for stirring the components (reaction temperature) is, for example, preferably 30 to 80° C., more preferably 50 to 70° C.

The reaction time is generally, for example, 20 minutes to 1 hour.

Although the reaction atmosphere may be an atmosphere under atmospheric pressure, reduced pressure or increased pressure, when operability is taken into consideration, the stirring and mixing (reaction) of the components are preferably carried out under atmospheric pressure. The reaction may be carried out in an air atmosphere, inert gas atmosphere or dry air atmosphere, preferably an air atmosphere when operability is taken into consideration.

By carrying out the reaction under the above conditions, the inside of the reaction system becomes homogeneous (the solution becomes transparent). Then, when the reaction is continued under agitation, the solution in the reaction system begins to suspend. Before the degree of suspension becomes high, a desired amount of the above base is added to the inside of the reaction system for neutralization. At this point, when the temperature rises and exceeds the boiling point of the solvent by neutralization heat, a precipitate produced by neutralization foams. Therefore, it is desired that neutralization should be carried out at a speed at which the temperature rising at the time of neutralization does not exceed the boiling point.

As a treatment after the addition of the base, the following method is preferably employed. A yellow colored component which seems to be a yellow colored bismuth oxide component partially produced may be observed in the obtained reaction solution. When this yellow colored component is existent, the reaction solution is preferably kept heated and stirred, whereby the component is re-dispersed to obtain a colorless reaction solution. This state is desirably considered as the end of the reaction. When the obtained reaction solution is colorless, it may be considered that the reaction ends.

After the neutralization reaction is completed, when water is used as a solvent, a precipitate produced at the time of heating at 50 to 70° C. is filtered out and cleaned with water having the same temperature on filter paper. By carrying out this operation, the acid and the excessively used (meth) acrylic acid can be removed, thereby making it possible to obtain bismuth (meth)acrylate which is rarely colored and contains few impurities.

A description is subsequently given of the bismuth compound of the present invention.

<Bismuth Compound>

The bismuth compound of the present invention contains a compound in which a phosphoric acid ester having a (meth)acrylic group(s) is bonded to bismuth (may be simply refer to as "phosphoric acid ester" hereinafter). When this compound is contained, solubility, especially solubility in a radically polymerizable monomer in the form of a solution is improved. As a result, a cured product obtained by curing a curable composition comprising this compound and the radically polymerizable monomer may have excellent physical properties and contain a highly concentrated bismuth component. This bismuth compound can have higher solubility in a radically polymerizable monomer than the above bismuth (meth)acrylate or bismuth subsalicylate.

The bonding form between bismuth and the phosphoric acid ester having a (meth)acrylic group(s) is not particularly limited and may be ion bonding or coordinate bonding.

The bismuth compound may contain a compound in which bismuth oxide forms a composite with a phosphoric acid ester and, optionally, (meth)acrylic acid or salicylic acid (to be simply referred to as "compound derived from bismuth oxide" hereinafter) in addition to the compound in which a phosphoric acid ester is bonded to bismuth. Although the structure of this compound forming a composite (compound derived from bismuth oxide) is unknown, it is considered that a hydroxyl group formed on the surface of bismuth oxide and the carboxyl group of the phosphoric acid ester and, optionally, (meth)acrylic acid or salicylic acid are bonded together by condensation. It is very difficult to separate this compound derived from bismuth oxide from the bismuth compound. Therefore, when the compound derived from bismuth oxide is by-produced, it is preferred to use the bismuth compound while it contains the compound derived from bismuth oxide. When the compound derived from bismuth oxide is by-produced, it is desirable that the amount of the compound should be controlled to a range that does not reduce the solubility of bismuth (meth)acrylate or bismuth subsalicylate by adjusting production conditions. Whether the compound derived from bismuth oxide is contained or not can be comprehensively judged by production conditions or IR, NMR or X-ray photoelectron spectroscopic analysis (XPS).

As for the bismuth compound, the phosphoric acid ester which is bonded or forms a composite is preferably composed of a phosphoric acid ester having one (meth)acrylic group (phosphoric mono(di)ester) such as dihydrogen 2-(methacryloyloxy)ethyl phosphate or hydrogen phenyl-2-(methacryloyloxy)ethyl phosphate or a phosphoric acid ester having two (meth)acrylic groups (phosphoric diester) such as hydrogen bis[2-(methacryloyloxy)ethyl] phosphate. The phosphoric acid ester may be composed of only one of a phosphoric acid ester having one (meth)acrylic group and a phosphoric acid ester having two (meth)acrylic groups or both of them in an arbitrary ratio. To obtain a bismuth compound which is rarely colored, only a phosphoric acid ester having one (meth)acrylic group (phosphoric monoester) may be bonded.

When the phosphoric acid ester is composed of a phosphoric acid ester having one (meth)acrylic group and a phosphoric acid ester having two (meth)acrylic groups, they are preferably used in the following ratio to improve solubility in a radically polymerizable monomer and suppress the agglomeration of the bismuth component. More specifically, the phosphoric acid ester is composed of 1 mole of a phosphoric acid ester having one (meth)acrylic group and preferably 0.05 to 3 moles, more preferably 0.1 to 2 moles, much more preferably 0.15 to 1 mole of a phosphoric acid ester having two (meth)acrylic groups. An advantage obtained by containing both of a phosphoric acid ester having one (meth)acrylic group and a phosphoric acid ester having two (meth)acrylic groups is considered as follows. That is, it is considered that bismuth has a preferred site to which a phosphoric acid ester having one (meth)acrylic group (having a divalent phosphate group) and a phosphoric acid ester having two (meth)acrylic groups (having a monovalent phosphate group) are bonded and that the phosphoric acid ester having two (meth)acrylic groups is existent in an amount of 0.05 to 3 moles based on 1 mole of the phosphoric acid ester having one (meth)acrylic group at the preferred bonding site. When the phosphoric acid ester having two (meth)acrylic groups is existent in that ratio, the concentration of bismuth tends to become low but the solubility in a radically polymerizable monomer of bismuth is improved. As a result, another advantage that the bismuth component can be made existent in a cured product in a high concentration in a well-balanced manner is obtained.

In the bismuth compound, another compound may be bonded to bismuth when the phosphoric acid ester is bonded to bismuth. Stated more specifically, salicylic acid or (meth)acrylic acid may be further bonded to bismuth. When the phosphoric acid ester and salicylic acid or (meth)acrylic acid are bonded to the same bismuth, the ratio of the phosphoric acid ester and the salicylic acid or (meth)acrylic acid is such that the amount of salicylic acid or (meth)acrylic acid is preferably 0.1 to 10 moles, more preferably 0.1 to 5 moles, much more preferably 0.1 to 1 mole, particularly preferably 0.1 to 0.5 mole based on 1 mole of the phosphoric acid ester in order to improve the productivity of the bismuth compound and solubility in a radically polymerizable monomer. When two or more phosphoric acid esters are existent, the above range is based on the total number of moles of these phosphoric acid esters.

The bismuth compound is a compound in which at least a phosphoric acid ester having a (meth)acrylic group(s) is bonded to bismuth. It can be confirmed by the production method or elemental analysis of the bismuth compound by IR, NMR (nuclear magnetic resonance spectrometry) or energy dispersion X-ray spectrometer (EDS) that the phosphoric acid ester having a (meth)acrylic group(s) is bonded. The number of bonds of each of salicylic acid or (meth)acrylic acid and the phosphoric acid ester can be known by these methods.

The preferred bismuth compounds of the present invention are represented by the following formulas (3) to (5).

[formula 3]

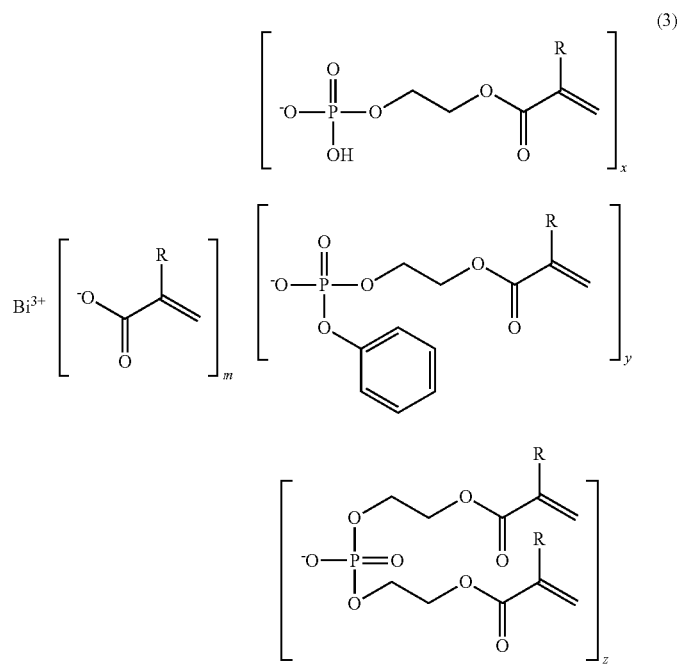

[formula 4]

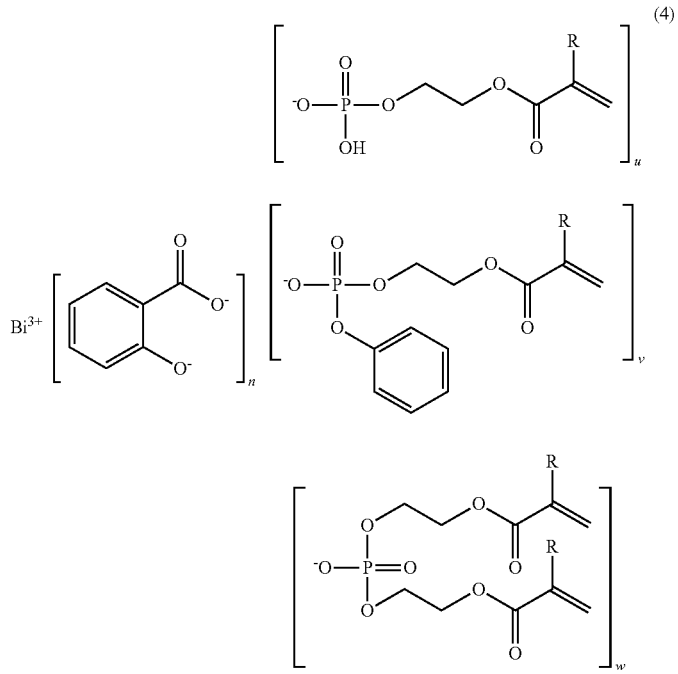

[formula 5]

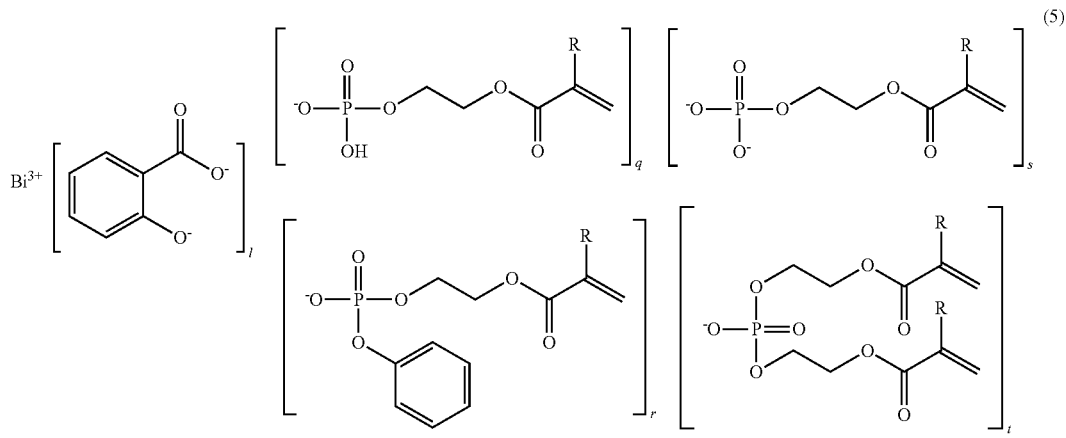

In the above formulas, R's are each independently a hydrogen atom or methyl group. In the above formula (3), m+x+y+z=3, and x, y, z and m are the numbers of moles of hydrogen 2-((meth)acryloyloxy)ethyl phosphate (x) residue, phenyl-2-((meth)acryloyloxy)ethyl phosphate (y) residue, bis[2-((meth)acryloyloxy)ethyl] phosphate (z) residue and (meth)acrylic acid (m) residue, respectively. In the above formula (4), 2n+u+v+w=3, and u, v, w and n are the numbers of moles of hydrogen 2-((meth)acryloyloxy)ethyl phosphate (u) residue, phenyl-2-((meth)acryloyloxy)ethyl phosphate (v) residue, bis[2-((meth)acryloyloxy)ethyl] phosphate (w) residue and salicylic acid (n) residue, respectively. In the above formula (5), 2l+q+r+2s+t=3, and q, r, s, t and l are the numbers of moles of hydrogen 2-((meth)acryloyloxy)ethyl phosphate (q) residue, phenyl-2-((meth)acryloyloxy)ethyl phosphate (r) residue, 2-((meth)acryloyloxy)ethyl phosphate (s) residue, bis[2-((meth)acryloyloxy)ethyl] phosphate (t) residue and salicylic acid (l) residue, respectively.

In the present invention, the bismuth compounds represented by the above formulas (3) to (5) may be each a mixture of a plurality of compounds and not a single compound. In this case, the number of moles of each residue represents the total number of moles of the residues of the whole mixture.

In the above formula (3), to obtain a bismuth compound which can be produced at a low temperature and is rarely colored, when m=0, preferably x:y:z=1:0.05~3:0.5~30, more preferably x:y:z=1:0.1~2:1~20, much more preferably x:y:z=1:0.15~1:1.5~10. m may be 0 and y may be 0 to suppress coloration.

In the above formula (4), when n=0, x, y and z should read u, v and w in the above specifications, respectively.

In the above formula (3), when m is not 0, preferably m:(x+y+z)=0.1~10:1, more preferably m:(x+y+z)=0.1~5:1, much more preferably m:(x+y+z)=0.1~1:1. Even in this case, x:y:z=1:0.05~3:0.5~30, more preferably x:y:z=1:0.1~2:1~20, much more preferably x:y:z=1:0.15~1:1.5~10.

In the above formula (4), when n is not 0, preferably n:(n+v+w)=1:0.1~1:30, more preferably n:(n+v+w)=1:0.2~1:20, much more preferably n:(n+v+w)=1:0.3~1:10, particularly preferably n:(n+v+w)=1:0.5:5. Even in this case, preferably u:v:w=1:20~0.05:40~0.1, more preferably u:v:w=1:10~0.1:20~0.2, much more preferably u:v:w=1:5~0.2:10~0.4.

Out of these compounds, at least a compound in which bismuth subsalicylate is bonded to hydrogen phenyl-2 ((meth)acryloyloxy)ethyl phosphate is preferably contained. In the above formula (5), preferably l:(q+r+s+t)=1:0.1~30, more preferably l:(q+r+s+t)=1:0.2~20, much more preferably l:(q+r+s+t)=1:0.3~10, particularly preferably l:(q+r+s+t)=1:0.5:5. Even in this case, preferably q:r:s:t=1:50~0.1:20~0.05:40~0.1, more preferably q:r:s:t=1:30~0.3:10~0.1:20~0.2, much more preferably q:r:s:t=1:20~0.5:5~0.2:10~0.4.

Out of these compounds, at least a compound in which bismuth subsalicylate is bonded to dihydrogen-2-((meth)acryloyloxy)ethyl phosphate in a ratio of 2:1 is preferably contained.

The bismuth compound of the present invention forms a particulate agglomerate due to its high cohesiveness or low solubility. At this point, when it is observed through a field emission scanning transmission electron microscope, the long diameter of the agglomerated particle preferably becomes 0.1 to 30 nm. When the long diameter of the agglomerated particle is 0.1 to 30 nm, it is considered that the bismuth compound has high solubility in an organic matter, especially a radically polymerizable monomer and high dispersibility in the obtained cured product.

When the long diameter of the agglomerated particle becomes larger than 30 nm, solubility tends to become low and dispersibility in the obtained cured product tends to drop. When the long diameter of the agglomerated particle becomes smaller than 0.1 nm, production becomes difficult, a product like a complex in which three (meth)acrylic acids are bonded to bismuth is obtained, the concentration of bismuth becomes low, solubility in an organic matter lowers, and the dispersion state in the obtained cured product tends to deteriorate.

In the bismuth compound, the long diameter is preferably 0.5 to 20 nm, more preferably 0.5 to 10 nm when the productivity, solubility in an organic matter and dispersibility in the obtained cured product of the bismuth compound are taken into consideration.

In the bismuth compound, a particulate agglomerate is formed. The bismuth component in a compound in which a phosphoric acid ester and, optionally, salicylic acid or (meth)acrylic acid are bonded to bismuth and a compound in which bismuth oxide contained as required forms a composite with a phosphoric acid ester and, optionally, salicylic acid or (meth)acrylic acid (compound derived from bismuth oxide) can be confirmed by a field emission scanning transmission electron microscope (STEM). The long diameter of the agglomerated particle of the observed bismuth component is preferably 0.1 to 30 nm.

A description is subsequently given of a preferred method of producing the bismuth compound.

<Production Method of Bismuth Compound>

In the present invention, the bismuth compound is preferably produced by reacting the above bismuth (meth)acrylate or bismuth subsalicylate with the phosphoric acid ester having a (meth)acrylic group(s).

Stated more specifically, the bismuth compound of the present invention is preferably produced by reacting the above bismuth (meth)acrylate or bismuth subsalicylate with the phosphoric acid ester having a methacrylic group(s) in an aliphatic hydrocarbon solvent or aromatic solvent by adding a polymerization inhibitor when necessary and carrying out dehydration.

<Phosphoric Acid Ester Having a (Meth)Acrylic Group(s) (Phosphoric Acid Ester); Production Method of Bismuth Compound>

As the phosphoric acid ester having a (meth)acrylic group(s), a commercially available product may be used. The phosphoric acid ester may be a phosphoric acid ester having one (meth)acrylic group, a phosphoric acid ester having two (meth)acrylic groups or a mixture thereof. Examples of the phosphoric acid ester having one (meth)acrylic group (may be referred to as "monofunctional phosphoric acid ester" hereinafter) include dihydrogen 2-(methacryloyloxy)ethyl phosphate and hydrogen phenyl-2-(methacryloyloxy)ethyl phosphate. Examples of the phosphoric acid ester having two (meth)acrylic groups (may be simply referred to as "bifunctional phosphoric acid ester" hereinafter) include hydrogen bis[2-(methacryloyloxy)ethyl] phosphate. As a matter of course, a mixture of the above monofunctional phosphoric acid ester and the bifunctional phosphoric acid ester may be used in a reaction.

The amount of the phosphoric acid ester may be determined in order to obtain a bismuth compound of interest. More specifically, the amount of the phosphoric acid ester is preferably 0.3 to 10 moles based on 1 mole of bismuth (meth)acrylate or bismuth subsalicylate.

In the present invention, as the phosphoric acid ester having a (meth)acrylic group(s), to improve compatibility with another monomer, a phosphoric triester such as diphenyl-2-methacryloyloxyethyl phosphate, phenyl bis[2-(methacryloyloxyethyl)]phosphate or tris[2-(methacryloyloxyethyl)]phosphate may be further added.

When a phosphoric triester having a phenyl group such as diphenyl-2-methacryloyloxyethyl phosphate or phenyl bis[2-(methacryloyloxyethyl)]phosphate is used out of these, a monovalent phenyl phosphoric diester having one (meth)acrylic group can be introduced in the formulas (3) to (5).

The amount of the phosphoric triester is preferably 0.1 to 20 moles, more preferably 0.2 to 5 moles based on 1 mole of the phosphoric acid ester having one (meth)acrylic group and/or the phosphoric acid ester having two (meth)acrylic groups.

<Aliphatic Hydrocarbon Solvent or Aromatic Solvent>

In the present invention, it is preferred that the above bismuth (meth)acrylate or bismuth subsalicylate and the above phosphoric acid ester should be mixed together under agitation in an aliphatic hydrocarbon solvent or aromatic solvent to be reacted with each other. As water is produced in the reaction system at this point, the produced water is preferably removed. To remove the produced water easily, an aliphatic hydrocarbon solvent or aromatic solvent having a high boiling point, specifically 100° C. or higher is preferably used. The aliphatic hydrocarbon solvent or aromatic solvent may be used as a mixed solution.

Examples of the aliphatic hydrocarbon solvent and the aromatic solvent include hexane, heptane, nonane, decane, undecane, dodecane, xylene, dimethoxybenzene and isomers thereof, benzene, toluene, chlorobenzene, bromobenzene, anisole, petroleum ether, petroleum benzene and benzoin. The amount of the aliphatic hydrocarbon solvent or the aromatic solvent is not particularly limited if it can mix the above bismuth (meth)acrylate or bismuth subsalicylate and the phosphoric acid ester completely. When the productivity of the bismuth compound is taken into consideration, the aliphatic hydrocarbon solvent or the aromatic solvent is preferably used in an amount of 10 to 100 ml based on 1 g of bismuth (meth)acrylate or bismuth subsalicylate.

<Reaction Conditions; Production Method of Bismuth Compound>

In the present invention, the method of introducing the above bismuth (meth)acrylate or bismuth subsalicylate and the above phosphoric acid ester into the reaction system is not particularly limited. A method in which the above bismuth (meth)acrylate or bismuth subsalicylate diluted with the above aliphatic hydrocarbon solvent or aromatic solvent as required and the above phosphoric acid ester diluted with the above aliphatic hydrocarbon solvent or aromatic solvent as required are added together to the inside of the reaction system and mixed together under agitation may be employed. Another method in which the aliphatic hydrocarbon solvent or the aromatic solvent is introduced into the reaction system in advance and the above bismuth (meth)acrylate or bismuth salicylate diluted with the above aliphatic hydrocarbon solvent or aromatic solvent as required and the above phosphoric acid ester diluted with the aliphatic hydrocarbon solvent or aromatic solvent as required are added and mixed together under agitation may be employed. A further method in which one of the components is introduced into the reaction system in advance and the other component is introduced into the reaction system to be mixed with the first component under agitation may be employed. To reduce the coloration of the obtained bismuth compound and improve productivity, the following method is preferably employed. Bismuth (meth)acrylate or bismuth subsalicylate is first made homogeneous in the aliphatic hydrocarbon solvent or aromatic solvent. In this case, bismuth (meth)acrylate or bismuth subsalicylate may not dissolve. In this case, to prevent the existence of a massive material of the bismuth (meth)acrylate or bismuth subsalicylate, the massive material is preferably pulverized by an ultrasonic device. Thereafter, a method in which the phosphoric acid ester is added to a cloudy solution containing bismuth (meth)acrylate or bismuth subsalicylate dispersed therein and stirred and heated is preferably employed.

The temperature (reaction temperature) for stirring these components may be the reflux temperature of the aliphatic hydrocarbon solvent or aromatic solvent but preferably 30 to 110° C., more preferably 40 to 100° C., much more preferably 45 to 90° C. so as to suppress the coloration of the obtained bismuth compound.

When the reaction temperature is 30 to 110° C., the inside of the reaction system is preferably depressurized to remove (dehydrate) water produced in the inside of the reaction system. This dehydration may be carried out while the above bismuth (meth)acrylate or bismuth subsalicylate and the above phosphoric acid ester are mixed together or after they are mixed together. When reaction efficiency is taken into consideration, dehydration is preferably carried out while they are mixed together.

The reaction time is not particularly limited but generally 20 minutes to 2 hours.

The atmosphere for carrying out the reaction may be an air atmosphere, inert gas atmosphere or dry air atmosphere but preferably an air atmosphere when operability is taken into consideration.

After the reaction is carried out under the above conditions, the obtained bismuth compound is concentrated by distilling off the solvent, and then an insoluble cloudy component is preferably filtered out or separated by centrifugal separation if there is any. Further, a solvent which is soluble in the reaction solvent in use and does not dissolve the bismuth compound is added to the concentrated reaction solution obtained by this treatment to carry out re-precipitation for purification. When a high-boiling point solvent remains, the above decantation operation is repeated to substitute the solvent. After the bismuth compound is purified by distilling off the remaining solvent and vacuum drying, it can be taken out.

A cured product can be produced by polymerizing and curing the obtained bismuth compound alone. To make the obtained cured product useful, a curable composition comprising another radically polymerizable monomer is preferably prepared.

<Curable Composition>

The present invention provides a curable composition comprising the above bismuth compound and a radically polymerizable monomer (may be simply referred to as "radically polymerizable monomer" hereinafter) other than the bismuth compound.

<Radically Polymerizable Monomer Other than Bismuth Compound>

In the present invention, as the above radically polymerizable monomer, an ordinary known monomer may be used. Examples thereof include commercially available monofunctional or multifunctional acrylic acid and methacrylic acid esters and vinyl compounds such as acrylic acid, methacrylic acid, methyl acrylate, methyl methacrylate, vinyl pyridine, vinyl pyrrolidone, acrylonitrile, phenyl methacrylate, benzyl methacrylate and 2-phenoxyethyl methacrylate. When the solubility of the above bismuth compound is taken into consideration, a styrene compound may be used. Examples of the styrene compound include styrene, methyl styrene and structural isomers thereof, methyl styrene dimer, chlorostyrene, bromostyrene and divinylbenzene. The above radically polymerizable monomers may be used alone or in combination.

<Preferred Blending Ratio>

In the curable composition, the blending ratio of the bismuth compound and the radically polymerizable monomer other than the bismuth compound is suitably determined according to the use purpose of the obtained cured product.

When the bismuth compound is used and an X-ray shielding effect, dispersibility and coloration reduction effect are taken into consideration, the radically polymerizable monomer is used in an amount of preferably 1 to 500 parts by mass, more preferably 5 to 300 parts by mass, much more preferably 10 to 200 parts by mass based on 100 parts by mass of the bismuth compound.

<Other Compounding Agents>

The curable composition of the present invention may comprise known compounding agents which are mixed with a radically polymerizable curable composition besides the bismuth compound and the radically polymerizable monomer.

More specifically, a radical polymerization initiator, antioxidant, release agent for improving releasability from a mold, coloring matter for controlling the color tone of a cured product and chain transfer agent for controlling polymerizability may be blended. These compounding agents may be blended as long as the effect of the present invention is not impaired. Each compounding agent is blended in an amount of preferably 0 to 30 parts by mass, more preferably 0.01 to 20 parts by mass, much more preferably 0.02 to 15 parts by mass based on 100 parts by mass of the total of the bismuth compound and the radically polymerizable monomer.

The curable composition can be produced by mixing together the above bismuth compound and the radically polymerizable monomer and, optionally, compounding agents.

<Production Method of Cured Product>

In the present invention, to obtain a cured product by curing the above curable composition, a known method may be employed. More specifically, photopolymerization, thermal polymerization or both of them may be employed. A preferred polymerization method is determined according to a radical polymerization initiator which is blended as required.

<Physical Properties of Obtained Cured Product>

The curable composition of the present invention can provide a cured product which has high transparency and is rarely colored though it comprises a large amount of the bismuth component having high X-ray shielding ability. The cured product obtained from the curable composition of the present invention has a transmittance at a wavelength of 560 nm of not less than 80%, an X-ray shielding ability equivalent to 0.02 mm or more of lead foil and a yellowness of not more than 40 when it has a thickness of 2 mm.

According to the present invention, the content of the bismuth component in the cured product can be set to 5 to 40 mass % based on 100 mass % of the total mass of the cured product.

<Use of Cured Product>

Since the cured product obtained by the present invention has radiation shielding ability though it transmits visible light, it can be used as a transparent radiation shielding material.

EXAMPLES

The following Examples and Comparative Examples are provided for the purpose of further illustrating the present invention but are in no way to be taken as limiting.

<Measurement of Long Diameter of Bismuth Component of Bismuth Compound>

A field emission scanning transmission electron microscope (STEM) (Tecnai (registered trademark) F20 of Thermo Fisher Scientific) was used for the observation of the bismuth compound (observation of the long diameter of the bismuth component). Form observation and element mapping (mapping of bismuth component) were carried out in a HAADF-STEM mode at an acceleration voltage of 200 kV. A sample was dropped on a copper mesh on which a collodion film was stretched, an excessive solution was absorbed by filter paper below the mesh, and the sample was dried with air and then under vacuum to be observed through a field emission scanning transmission electron microscope.

<Method of Analyzing Bismuth Compound>

A Fourier transform infrared spectrophotometer (Spectrum One manufactured by Perkin Elmer Co., Ltd.) was used for IR measurement. The measurement was made by a single reflection ATR method and the integration of four-time measurement data.

For TG-DTA measurement, a differential thermogravity simultaneous measurement device (TG8120 manufactured by Rigaku Corporation) was used. The sample was scanned in an air stream at a temperature range from room temperature to 500° C. and a temperature elevation rate of 10° C./min.

For Raman scattering measurement, a microscopic Raman spectroscopic device (NRS-7100 manufactured by JASCO Corporation) was used, and a 532 nm laser, a 100-power objective lens, a 600 line/mm grating and 25 μm diameter and 4,000 μm diameter apertures were used to excite the sample by carrying out 20 seconds of exposure two times.

For $^1$H and $^{31}$P-NMR measurements, a nuclear magnetic resonance device (JNM-ECA400II manufactured by JEOL RESONANCE) was used. Hexadeuteroacetone was used as a solvent, and measurement was made at a sample concentration of 1 wt %.

For XPS measurement, an X-ray photoemission spectrometer (ESCA5701ci/MC manufactured by ULVAC-PHI, Inc.) was used. A monochromatic Al-Kα (14 kV-330 W) was used as an X-ray source. The aperture diameter was 800 μm, and the photoelectron take-out angle was 45°. The sample was pulverized in an agate mortar, and the obtained powder was fixed on a substrate with a carbon tape and introduced into a measurement chamber for measurement.

<Measurement of Physical Properties of Cured Product Containing Bismuth Compound>

In Examples, a curable composition comprising the bismuth compound, a radically polymerizable monomer and, optionally, a thermopolymerization initiator was thermally polymerized to produce a 2 mm-thick cured product (plate). The 560 nm light transmittance of the obtained cured product was measured with an ultraviolet and visible spectrophotometer (UV-2550 manufactured by Shimadzu Corporation).

The yellowness of the cured product (plate) was measured by using S&M COLOUR COMPUTER SM-T manufactured by Suga Test Instruments Co., Ltd.

Further, as for the X-ray shielding ability of the obtained cured product, the shielding rate of 59.5 eV g-ray emitted from 241 Am was measured as the thickness equivalent of a lead plate.

Production Example 1

(Production of Bismuth Methacrylate)

55.9 g (115 mmol) of bismuth nitrate pentahydrate was fed to a 1,000 ml three-necked flask containing a stirrer, and 500 ml of deionized water was added. 5.4 g (HNO$_3$: 71 mmol) of concentrated nitric acid was added to the resulting solution and stirred lightly. 1.9 g of BHT and 75 ml (885 mmol) of methacrylic acid were added to the resulting solution. A thermometer, a Dimroth condenser and a dropping funnel containing a solution prepared by dissolving 37.4 g (935 mmol) of sodium hydroxide in 60 ml of deionized water were attached to this flask, and the flask was put into an oil bath to heat the contents of the flask from room temperature to 65° C. under agitation within 20 minutes. At this point, bismuth nitrate was almost all dissolved and BHT slightly remained solid. The sodium hydroxide aqueous solution in the dropping funnel was injected into this solution at a time. A slightly yellowed precipitate was produced, and the inside of the reaction system became heterogeneous.

At this point, the inside temperature of the flask became around 85° C. The contents were stirred for 1 hour while the flask was heated up to 95° C. It was considered that the reaction ended when the precipitate turned colorless from yellow.

After the end of the reaction, the precipitate was filtered while it was hot when the inside temperature of the flask dropped to 50° C. The precipitate was cleaned twice with 50 ml of 50° C. water. It was dried with air for 2 days. Thereby, 55.9 g of bismuth methacrylate was obtained.

A solution containing the obtained sample dissolved in chloroform was observed through STEM. As a result, a particle having a diameter of not more than 5 nm and containing Bi as an element could be confirmed. The spectrum of methacrylic acid bonded to a metal ion was obtained by IR measurement. It was found from a weight loss obtained by thermal decomposition measurement that 3 molecules of methacrylic acid were bonded to bismuth.

Example 1

10.6 g (22.8 mmol in terms of bismuth) of bismuth methacrylate obtained in Production Example 1 and 15.3 g of a phosphoric acid ester (2-methacryloyloxyethyl acid phosphate; MR-200 manufactured by Daihachi Chemical Industry Co., Ltd. (a mixture of phosphoric monoester and phosphoric diester in a ratio of about 1:1, 30.3 mmol of dihydrogen 2-(methacryloyloxy)ethyl phosphate, 29.1 mmol of hydrogen bis[2-(methacryloyloxy)ethyl] phosphate)) were fed to a 1,000 ml eggplant-shaped flask, and 300 ml of toluene was added to the flask. They were ultrasonically dispersed by a bath type sonicator.

The obtained cloudy solution was transferred into a 1,000 ml four-necked flask equipped with a Dean-Stark trap to carry out a reaction by heating at 120° C. in an oil bath under agitation, and the produced water was removed to the outside of the system. It was considered that the reaction ended when water was not produced any more. A homogeneous dispersion was obtained.

This solution was transferred into a 500 ml conical beaker and left to stand for 2 days. A white precipitate was slightly produced. This dispersion was filtered with a 0.2 μm membrane filter carrying celite to obtain a colorless and transparent solution. This solution was concentrated up to 50 ml by an evaporator, and 400 ml of hexane was added to this solution. A viscous white precipitate was produced. It was dispersed by a bath type sonicator and left to stand. The supernatant hexane was removed by decantation. Cleaning by removing hexane was repeated three times. A trace amount of hexane remaining in the end was removed by an evaporator, and the obtained product was vacuum dried. 14.3 g of a bismuth compound which was a white viscous matter was obtained.

A solution prepared by dissolving the obtained sample in toluene was observed through STEM (FIG. 1). It was found by XPS measurement that 1.4 moles of phosphorus was contained based on 1 mole of bismuth and by XPS analysis that 1.9 g of phosphorus was contained based on 1 mole of bismuth. Although there was a difference between these methods due to the low quantitativity of phosphorus, it was confirmed by IR, Raman, $^1$H and $^{31}$P-NMR analysis that 0.2 mole of (meth)acrylic acid and 1.8 moles of phosphoric acid esters were bonded to 1 mole of bismuth. The existence ratio of the two phosphoric acid esters was not made clear due to the broadening of $^{31}$P-NMR.

Production Example 2

A reaction was carried out under the same conditions as in production Example 1 except that 30 ml of methacrylic acid was used. The obtained sample was dissolved in chloroform, and the resulting solution containing the sample slightly dissolved therein was observed through STEM (FIG. 2). In FIG. 2, an agglomerate of plate-like particles having a diameter of not less than 50 nm was observed. Since this compound rarely dissolved in a monomer, a cured product was not evaluated.

Production Example 3

12.1 g of a commercially available bismuth oxide fine particle (100 nm $Bi_2O_3$ particle manufactured by CIK), 0.50 g of dibutyl hydroxy toluene (BHT) and 12.2 g of MR-200 (described in Example 1) were fed to a 1,000 ml flask equipped with a Dean-Stark trap and dispersed in 500 ml of toluene. The obtained dispersion was heated and refluxed under agitation to carry out a dehydration reaction. After the end of the reaction, an insoluble matter was filtered out and the solvent was distilled off from the filtrate. The obtained dark brown viscous matter was cleaned with hexane three times and dried. 14.7 g of a dark brown viscous matter was obtained. It was assumed that this was a compound in which a phosphorus acid ester was bonded to bismuth oxide.

Example 2

Synthesis was carried out under the same conditions as in Example 1 except that a 500 ml eggplant-shaped flask was used as a reaction layer and connected to an evaporator to carry out a reaction at 50° C. under reduced pressure. Although the reaction was carried out while toluene was distilled off under reduced pressure, when the amount of the remaining gel solution became about 50 ml, 300 ml of toluene was added again to disperse the reaction product homogeneously. A solution having higher transparency than the first solution was obtained. This solution was heated at 50° C. again to distill off the solvent under reduced pressure. After concentration, 400 ml of toluene was further added to obtain a homogeneous dispersion. The same measurements as in Example 1 were carried out to identify the compound. In Example 2, as a result of measurements, methacrylic acid was rarely bonded, and it was found by EDS analysis that 2.5 moles of phosphorus was contained based on 1 mole of bismuth and by XPS analysis that 2.6 moles of phosphorus was contained based on 1 mole of bismuth. It was confirmed by $^{31}$P-NMR analysis that only a phosphoric monoester was observed as a clear peak. That is, a bismuth compound in which only a phosphoric monoester was bonded was produced.

Example 3

8.2 g of the bismuth compound obtained in Example 1 was dissolved in 6.2 g of a mixed monomer of styrene and benzyl methacrylate in a weight ratio of 1:1. Further, 0.03 g of azobisisobutyronitrile (AIBN) was added to the resulting solution to be completely dissolved therein. This monomer solution was put under reduced pressure by a vacuum pump to remove dissolved oxygen. This monomer solution was injected into a glass mold having a thickness of 2 mm to be polymerized at a maximum temperature of 90° C. for 2 hours so as to obtain a cured product. The yellowness, 560 nm transmittance and X-ray shielding ability of the obtained cured product were measured by the above methods. The results are shown in Table 1.

Example 4

A cured product was obtained in the same manner as in Example 3 except that 3.1 g of the bismuth compound obtained in Example 2 and 3.1 g of the mixed monomer used in Example 3 were used. The yellowness, 560 nm transmittance and X-ray shielding ability of the obtained cured product were measured by the above methods. The results are shown in Table 1.

Example 5

15.96 g of bismuth (III) subsalicylate (manufactured by Sigma-Aldrich, 44.08 mmol in terms of bismuth), 3.42 g of bismuth (III) nitrate (manufactured by Alfa Aesar, 8.86 mmol in terms of bismuth), 47.23 g of a phosphoric acid ester (2-methacryloyloxyethyl acid phosphate; MR-200 manufactured by Daihachi Chemical Industry Co., Ltd. (a mixture of phosphoric monoester and phosphoric diester in a ratio of about 1:1, acid value of 275 KOH mg/mg, molecular weight based on $H^+$: 204.02)) and 3.67 g of dibutyl hydroxy toluene, (BHT manufactured by Wako Pure Chemical Industries, Ltd.) as a polymerization inhibitor were fed to a 500 ml eggplant-shaped flask, and then 300 ml of toluene was added. The resulting solution was ultrasonically dispersed by a bath type sonicator.

The obtained cloudy solution was transferred into a 500 ml four-necked flask equipped with a Dean-Stark trap to carry out a reaction by heating at 120° C. in an oil bath under agitation, and the produced water was removed to the outside of the system. It was considered that the reaction ended when water was not produced any more. A weak scattering light yellow solution in which a light yellow precipitate was slightly produced was obtained.

This solution was put in a centrifugal separator at 20,000×g for 30 minutes to pressure filter the supernatant with a 0.2 μm membrane filter so as to obtain a weak scattering light yellow solution. This solution was concentrated up to 50 ml by an evaporator, and 400 ml of hexane was added. A viscous white precipitate was produced. It was dispersed by a bath type sonicator and left to stand. The supernatant hexane was removed by decantation. Cleaning by removing hexane was repeated three times. 2.54 g of BHT was added to the obtained white viscous matter, and the resulting mixture was dispersed in 100 ml of acetone. To remove a trace amount of remaining hexane, the organic solvent was distilled off by an evaporator, and acetone was added to ensure that the whole amount became 100 ml and dissolve the viscous matter, thereby obtaining a strong scattering light yellow solution. This solution was put in a centrifugal separator at 20,000×g for 30 minutes to pressure filter the supernatant with a 0.2 μm membrane filter so as to obtain a weak scattering light yellow solution. The organic solvent was removed by an evaporator, and the obtained product was vacuum dried. 55.04 g of a bismuth compound which was a scattering light yellow viscous liquid was obtained.

Example 6

0.12 g of 2,2'-azobis(2,4-dimethylvaleronitrile (V-65) was added to 16.28 g of the bismuth compound obtained in Example 5 to dissolve it completely. This monomer solution was put under reduced pressure by a vacuum pump to remove dissolved oxygen. This monomer solution was injected into a glass mold having a thickness of 2 mm to be polymerized at a maximum temperature of 90° C. for 3 hours so as to obtain a cured product. The yellowness, 560 nm transmittance and X-ray shielding ability of the obtained cured product were measured by the above methods. The results are shown in Table 1.

When the obtained cured product was analyzed, it was found by XPS measurement that 2.29 moles of phosphorus was contained based on 1 mole of bismuth.

Example 7

37.59 g of bismuth (III) subsalicylate (manufactured by Sigma-Aldrich, 103.81 mmol in terms of bismuth), 16.72 g of a phosphoric diester (bis[(2-methacryloyloxyethyl]phosphate (manufactured by Sigma-Aldrich, 51.89 mmol)), 18.81 g a phosphoric triester (diphenyl-2-methacryloyloxyethyl phosphate) (MR-200 manufactured by Daihachi Chemical Industry Co., Ltd., 51.92 mmol) and 18.59 g of dibutyl hydroxy toluene (BHT, manufactured by Wako Pure Chemical Industries, Ltd.) as a polymerization inhibitor were fed to a 1,000 ml eggplant-shaped flask, and 700 ml of toluene was added. They were ultrasonically dispersed by a bath type sonicator to obtain a cloudy solution.

The obtained cloudy solution was transferred into a 1,000 ml four-necked flask equipped with a Dean-Stark trap to carry out a reaction by heating at 120° C. in an oil bath under agitation, and the produced water was removed to the outside of the system. It was considered that the reaction ended when water was not produced any more. A weak scattering light yellowish green solution in which a light yellow precipitate was slightly produced was obtained.

This solution was put in a centrifugal separator at 20,000×g for 30 minutes to decant the supernatant, activated carbon was added to this, and the obtained product was put in a centrifugal separator at 20,000×g for 30 minutes. The supernatant was pressure filtered by a 0.2 μm membrane filter to obtain a light yellow transparent solution. This solution was concentrated up to 50 ml by an evaporator, and 400 ml of hexane was added. A viscous white precipitate was produced. It was dispersed by a bath type sonicator and left to stand. The supernatant hexane was removed by decantation. Cleaning by removing hexane was repeated three times. 0.50 g of BHT was added to the obtained light yellow gum-like solid to disperse it in 100 ml of acetone. To remove a trace amount of remaining hexane, the organic solvent was distilled off by an evaporator, and acetone was added again to ensure that the total amount became 100 ml and dissolve the solid. A scattering light yellowish green solution was obtained. This solution was put in a centrifugal separator at 20,000×g for 90 minutes, and the supernatant was pressure filtered by a 0.2 μm membrane filter to obtain a weak scattering light yellow solution. The organic solvent was removed by an evaporator, and the obtained product was vacuum dried. 38.60 g of a bismuth compound which was a light yellow transparent syrup-like fluid was obtained.

Example 8

2.47 g of styrene was added to 15.04 g of the bismuth compound obtained in Example 7 to dissolve it homogeneously. 0.12 g of 2,2'-azobis(2,4-dimethylvaleronitrile) (V-65) was further added to the resulting solution so as to dissolve the bismuth compound completely. This monomer solution was put under reduced pressure by a vacuum pump to remove dissolved oxygen. This monomer solution was injected into a glass mold having a thickness of 2 mm to be polymerized at a maximum temperature of 90° C. for 3 hours so as to obtain a cured product. The yellowness, 560 nm transmittance and X-ray shielding ability of the obtained cured product were measured by the above methods. The results are shown in Table 1.

When the obtained cured product was analyzed, it was found by XFR analysis that 0.54 mole of phosphorus was contained based on 1 mole of bismuth.

Comparative Example 1

A cured product was obtained in the same manner as in Example 3 except that 7.1 g of the bismuth oxide soluble matter obtained in Production Example 3 and 1.0 g of the mixed monomer used in Example 3 were used. The yellowness, 560 nm transmittance and X-ray shielding ability of the obtained cured product were measured by the above methods. The results are shown in Table 1.

TABLE 1

| | Yellowness | 560 nm Transmittance (%) | X-ray shielding ability (mmPb/2 mm) |
|---|---|---|---|
| Ex. 3 | 35.1 | 52.6 | 0.067 |
| Ex. 4 | 15.9 | 83.8 | 0.042 |
| Ex. 6 | 10.5 | 86.6 | 0.054 |
| Ex. 8 | 21.4 | 85.1 | 0.100 |
| C. Ex. 1 | 209.6 | 0.2 | 0.073 |

Ex.: Example
C. Ex.: Comparative Example

The yellowness, 560 nm transmittance and X-ray shielding ability of each of the plates obtained in Examples 3, 4, 6 and 8 and Comparative Example 1 are shown in Table 1. Although the plate of Comparative Example 1 had high X-ray shielding ability due to the amount of bismuth oxide, it was greatly colored and rarely transmitted light. Meanwhile, the plates of Examples 3, 4, 6 and 8 had shielding ability corresponding to the amount of bismuth, such high transparency that they can be used as optical materials and allowable yellowness.

The invention claimed is:

1. A bismuth compound in which a phosphoric acid ester having a (meth)acrylic group(s) is bonded to bismuth, wherein the phosphoric acid ester having a (meth)acrylic group(s) is at least one selected from the group consisting of dihydrogen 2-((meth)acryloyloxy)ethyl phosphate and hydrogen bis[2-((meth)acryloyloxy)ethyl] phosphate.

2. The bismuth compound according to claim 1, wherein salicylic acid or (meth)acrylic acid is further bonded to the bismuth.

3. A curable composition comprising the bismuth compound of claim 1 and a radically polymerizable monomer different from the bismuth compound.

4. The curable composition according to claim 3, wherein the radically polymerizable monomer comprises a styrene compound.

5. A cured product of the curable composition of claim 3.

6. A method of producing the bismuth compound of claim 1, which comprises by reacting bismuth (meth)acrylate or bismuth subsalicylate with a phosphoric acid ester having a (meth)acrylic group(s) to carry out dehydration.

7. The method according to claim 6, wherein the phosphoric acid ester having a (meth)acrylic acid is used in an amount of 0.3 to 10 moles based on 1 mole of bismuth (meth)acrylate or bismuth subsalicylate to produce the bismuth compound.

8. The method according to claim 6, wherein bismuth (meth)acrylate or bismuth subsalicylate is reacted with the phosphoric acid ester having a (meth)acrylic group(s) to carry out dehydration in an aliphatic hydrocarbon solvent or aromatic solvent.

9. The method according to claim 6, wherein bismuth (meth)acrylate or bismuth subsalicylate is reacted with the phosphoric acid ester having a (meth)acrylic group(s) to carry out dehydration under reduced pressure at a temperature of 50 to 100° C.

10. A curable composition comprising the bismuth compound of claim 2 and a radically polymerizable monomer different from the bismuth compound.

11. A cured product of the curable composition of claim 4.

12. The method according to claim 7, wherein bismuth (meth)acrylate or bismuth subsalicylate is reacted with the phosphoric acid ester having a (meth)acrylic group(s) to carry out dehydration in an aliphatic hydrocarbon solvent or aromatic solvent.

13. The method according to claim 7, wherein bismuth (meth)acrylate or bismuth subsalicylate is reacted with the phosphoric acid ester having a (meth)acrylic group(s) to carry out dehydration under reduced pressure at a temperature of 50 to 100° C.

14. The method according to claim 9, wherein bismuth (meth)acrylate or bismuth subsalicylate is reacted with the phosphoric acid ester having a (meth)acrylic group(s) to carry out dehydration under reduced pressure at a temperature of 50 to 100° C.

* * * * *